US011388557B2

(12) United States Patent
Lee

(10) Patent No.: US 11,388,557 B2
(45) Date of Patent: Jul. 12, 2022

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventor: Songeun Lee, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/173,543

(22) Filed: Feb. 11, 2021

(65) Prior Publication Data

US 2022/0053288 A1    Feb. 17, 2022

(30) Foreign Application Priority Data

Aug. 12, 2020 (KR) .................. 10-2020-0100892

(51) Int. Cl.
| | | |
|---|---|---|
| H04W 4/029 | (2018.01) | |
| H04N 7/18 | (2006.01) | |
| G07C 5/00 | (2006.01) | |
| H04W 4/021 | (2018.01) | |
| G10L 15/26 | (2006.01) | |

(52) U.S. Cl.
CPC ............ *H04W 4/029* (2018.02); *G07C 5/008* (2013.01); *H04N 7/183* (2013.01); *H04W 4/021* (2013.01); *G10L 15/26* (2013.01)

(58) Field of Classification Search
CPC ...... H04W 4/029; H04W 4/021; G07C 5/008; H04N 7/183; G10L 15/26
See application file for complete search history.

(56) References Cited

U.S. PATENT DOCUMENTS

| | | | | |
|---|---|---|---|---|
| 6,526,335 | B1* | 2/2003 | Treyz | ................... H04W 4/029 701/1 |
| 6,650,999 | B1* | 11/2003 | Brust | ................... B60R 25/102 340/932.2 |
| 7,386,437 | B2* | 6/2008 | Brulle-Drews | ......... G06F 40/58 704/3 |
| 8,249,880 | B2* | 8/2012 | Odinak | ................... G10L 15/22 704/275 |
| 9,194,710 | B1* | 11/2015 | Iyer | ..................... G01C 21/3697 |
| 9,230,440 | B1* | 1/2016 | Penilla | ..................... B60L 53/66 |
| 9,581,453 | B2* | 2/2017 | Lacher | ..................... G01S 19/13 |
| 10,657,812 | B2* | 5/2020 | Yanagida | ............... G08G 1/005 |
| 2011/0172909 | A1* | 7/2011 | Kahn | ..................... G01C 21/165 701/533 |
| 2011/0261200 | A1* | 10/2011 | Kanning | ................. H04W 4/02 348/148 |

(Continued)

FOREIGN PATENT DOCUMENTS

KR    10-2013-0083087 A    7/2013

*Primary Examiner* — Adnan Aziz
(74) *Attorney, Agent, or Firm* — Morgan, Lewis & Bockius LLP

(57) ABSTRACT

A controlling method of a vehicle includes: checking whether the vehicle is parked; upon checking that the vehicle is parked, guiding a driver to select whether to transmit parking location information; in response to a driver's selection of transmitting the parking location information, receiving the parking location information in a form of an audio signal from the driver; and transmitting the parking location information to a driver's portable device.

15 Claims, 5 Drawing Sheets

(56) References Cited

U.S. PATENT DOCUMENTS

| | | | |
|---|---|---|---|
| 2012/0229302 A1* | 9/2012 | Sri-Jayantha | G08G 1/0141 340/905 |
| 2012/0282908 A1* | 11/2012 | Nicolini | H04W 4/023 455/418 |
| 2012/0316774 A1* | 12/2012 | Yariv | G01C 21/26 701/423 |
| 2014/0232570 A1* | 8/2014 | Skinder | G08G 1/005 340/989 |
| 2014/0336920 A1* | 11/2014 | Burrell | G01C 21/206 701/409 |
| 2016/0111003 A1* | 4/2016 | Miura | G08G 1/144 340/932.2 |
| 2017/0091612 A1* | 3/2017 | Gruber | G06F 40/169 |
| 2017/0358208 A1* | 12/2017 | Kazemi | H04W 4/44 |
| 2018/0045535 A1* | 2/2018 | Kim | G06K 9/3258 |
| 2019/0164426 A1* | 5/2019 | Yanagida | G08G 1/005 |
| 2019/0378515 A1* | 12/2019 | Kim | G10L 17/00 |
| 2020/0047687 A1* | 2/2020 | Camhi | G10L 15/22 |
| 2020/0132473 A1* | 4/2020 | Shipley | G01S 19/49 |
| 2020/0279489 A1* | 9/2020 | Liu | G08G 1/205 |
| 2020/0389761 A1* | 12/2020 | Rao | H04W 4/029 |

* cited by examiner

FIG. 2

| CATEGORY | POI | GPS COORDINATES |
|---|---|---|
| APARTMENT COMPLEX | AA APARTMENT 1ST COMPLEX | ... |
| | BB APARTMENT 3RD COMPLEX | ... |
| LARGE MART/DEPARTMENT STORE | CC MART UNDERGROUND PARKING LOT | ... |
| | DD DEPARTMENT STORE PARKING LOT | ... |
| STADIUM | EE BASEBALL PARKING LOT | ... |
| | FF SOCCER FIELD PARKING LOT | ... |
| AMUSEMENT PARK | GG WORLD PARKING LOT | ... |
| | HH LAND PARKING LOT | ... |
| ... | ... | ... |

VEHICLE AND METHOD FOR CONTROLLING THEREOF

CROSS-REFERENCE TO RELATED APPLICATION(S)

The present application claims the benefit of priority to Korean Patent Application No 10-2020-0100892, filed on Aug. 12, 2020 in the Korean Intellectual Property Office, the entire contents of which is incorporated herein for all purposes by this reference.

TECHNICAL FIELD

The present disclosure relates to a vehicle and a control method thereof for providing parking location information of the vehicle.

BACKGROUND

A vehicle driver parks a vehicle in various places, and when parking the vehicle in a parking lot such as a large building or shopping mall, the driver needs to remember the specific parking location. In a case of an underground parking lot or parking structure having multiple floors, care must be taken to remember the floor or location of parking since each floor may look similar to each other. However, the driver may not pay attention to remembering the parking location, and thus the driver may spend a significant amount of time wandering around a large parking lot to find the vehicle.

The information included in this Background section is only for enhancement of understanding of the general background of the present disclosure and may not be taken as an acknowledgement or any form of suggestion that this information forms the prior art already known to a person skilled in the art.

BACKGROUND

An aspect of the present disclosure is to allow a driver to accurately find a parking location of a vehicle in a timely manner without forgetting the parking location of the vehicle by transmitting vehicle parking location information to a driver's mobile device.

In accordance with an aspect of the present disclosure, a controlling method of a vehicle may include: checking whether the vehicle is parked; upon checking that the driver is parked, guiding a driver to select whether to transmit parking location information; in response to a driver's selection of transmitting the parking location information, receiving the parking location information in a form of an audio signal from the driver; and transmitting the parking location information to a driver's portable device.

The checking whether the vehicle is parked may include determining that the vehicle is parked when the vehicle arrives at a destination set in a navigation mode.

The checking whether the vehicle is parked may include determining the vehicle is parked when a current GPS coordinates of the vehicle identified from the GPS signal match any one of a plurality of preset interest areas, and when the vehicle's transmission is in the parking mode (P mode).

The plurality of preset interest areas may be targets preset to provide parking location information; and categories, names, and GPS coordinates of each of the plurality of preset interest areas may be built into a database and provided to the vehicle.

The checking whether the vehicle is parked may include determining that the vehicle is parked when a request for transmission of the parking location information occurs from the driver.

The method may further include acquiring the parking location information and then acquiring additional information related to the parking location information, and when transmitting the parking location information, the additional information related to the parking location information is also transmitted.

The additional information may include an image around the vehicle at the location where the vehicle is parked.

Transmitting the parking location information may include converting and transmitting the parking location information in a form of an audio signal generated by the driver's utterance into textual parking location information.

Transmitting the parking location information may include converting and transmitting the parking location information in a form of an audio signal generated by the number of floors in the building in which the vehicle is located.

In accordance with another aspect of present disclosure, a vehicle may comprise: a Global Positioning System (GPS) communicator configured to receive a GPS signal; a navigation for route guidance; a voice recognizer configured to recognize an audio signal received through a microphone; and a controller configured to check whether the vehicle is parked; upon checking that the vehicle is parked, guide a driver to select whether to transmit parking location information; in response to a driver's selection of transmitting the parking location information, receive the parking location information in a form of an audio signal from the driver; and transmit the parking location information to a driver's portable device.

The checking whether the vehicle is parked may include determining that the vehicle is parked when the vehicle arrives at a destination set in a navigation mode.

Checking whether the vehicle is parked may include determining the vehicle is parked when a current GPS coordinates of the vehicle identified from the GPS signal match any one of a plurality of preset interest areas, and when the vehicle's transmission is in the parking mode (P mode).

The plurality of preset interest areas are targets preset to provide parking location information; and categories, names, and GPS coordinates of each of the plurality of preset interest areas may be built into a database and provided to the vehicle.

The checking whether the vehicle is parked may include determining that the vehicle is parked when a request for transmission of the parking location information occurs from the driver.

The controller may be configured to acquire the parking location information and then acquiring additional information related to the parking location information, and transmit the additional information related to the parking location information when transmitting the parking location information.

The additional information may include at least one of a front captured image or an around view captured image of the vehicle at the location where the vehicle is parked.

Transmitting the parking location information may include converting and transmitting the parking location information in a form of an audio signal generated by the driver's utterance into textual parking location information.

Transmitting the parking location information may include converting and transmitting the parking location information in a form of an audio signal generated by the number of floors in the building in which the vehicle is located.

According to another aspect of the present disclosure, a controlling method of a vehicle may include: checking whether the vehicle is parked; upon checking that the vehicle is parked, guiding a driver to select whether to transmit parking location information; in response to a driver's selection of transmitting the parking location information, receiving the parking location information in a form of an audio signal from the driver; acquiring an image by capturing surroundings of the vehicle at a parking location; converting the parking location information in the form of the audio signal into parking location information in the form of text; and transmitting the image around the vehicle to a driver's portable device together with the parking location information converted into the text form.

BRIEF DESCRIPTION OF THE DRAWINGS

FIG. 2 is a diagram illustrating an example of a POI database provided in a multimedia device of a vehicle according to an embodiment of the present disclosure.

DETAILED DESCRIPTION

Figure 1:
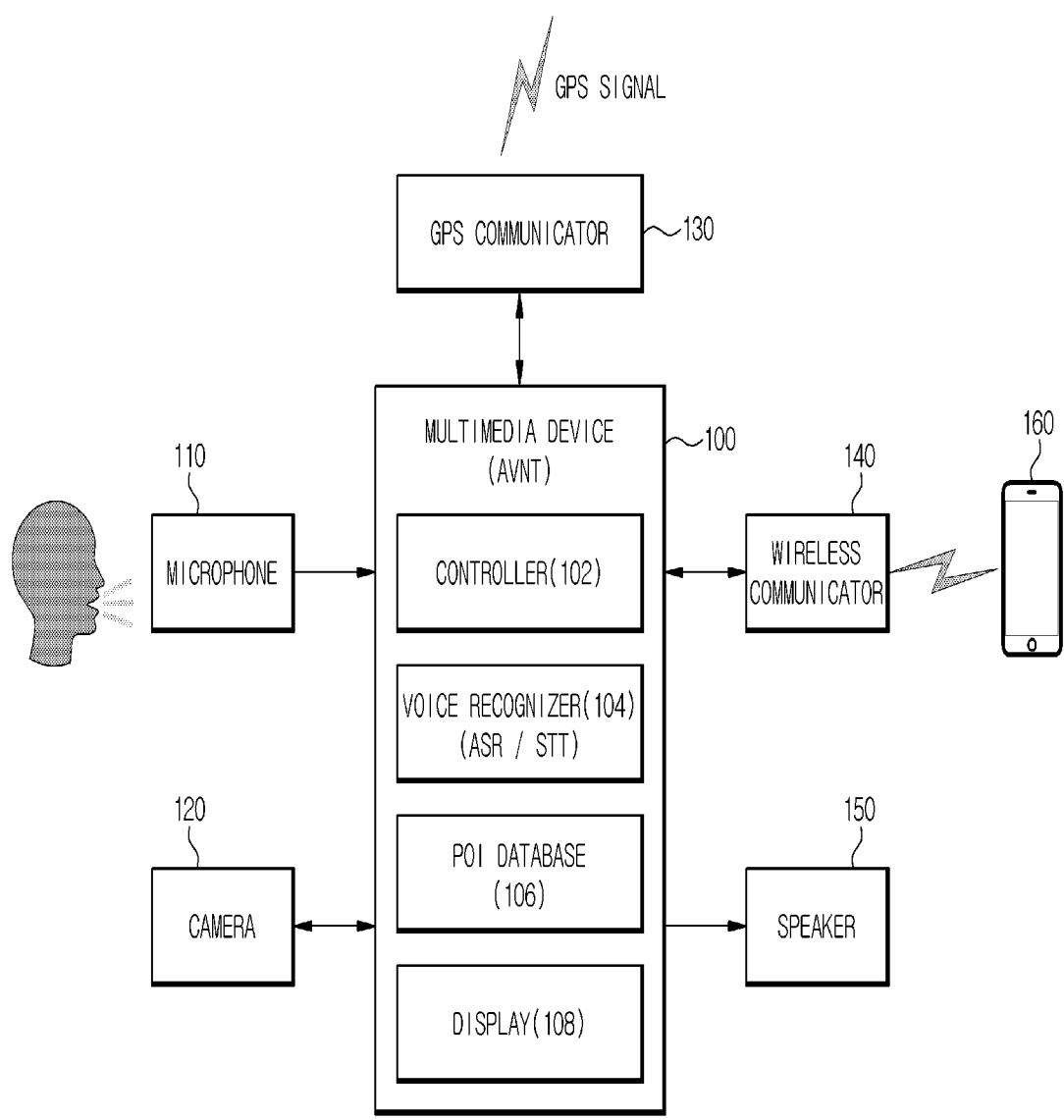
FIG. 1 is a diagram illustrating a control system of a vehicle according to an embodiment of the present disclosure.

FIG. 1 is a diagram showing a control system of a vehicle according to an embodiment of the present disclosure. In FIG. 1, a multimedia device 100 operates as AVNT (Audio Video Navigation Telematics), and in addition, operates as a subject of current parking location identification and transmission.

According to the present disclosure, the multimedia device 100 includes a controller 102, a voice recognizer 104, a Points-Of-Interest (POI) database 106, and a display 108.

The controller 102 may be an electronic control unit (ECU) that controls the overall operation of the multimedia device 100. However, it is not limited thereto that the controller 102 may be a computer or processor such as a CPU that can be programmed to perform various functions. In addition, the voice recognizer 104 and the Points-Of-Interest (POI) database 106 may be embedded in the controller 102 as one device.

The voice recognizer 104 recognizes an input voice signal (ASR) and converts the recognition result into text (STT). For example, the voice recognizer 104 performs voice recognition by receiving a voice signal related to a parking location uttered by the driver, and converts the parking location resulting from the voice recognition into text. In the present disclosure, the voice recognizer 104 may be a processor configured to be programmed to perform functions or embedded in the controller 102 as described above.

The POI database 106 is a database that stores information on a plurality of points of interest, that is, a plurality of parking location information provision targets. The object of providing parking location information stored in the POI database 106 is that, for example, location information of a parking lot such as an apartment complex of a certain size or larger, a large mart/department store, a stadium, an amusement park, etc. which has been secured in advance. It is used as data for judgment and providing parking information. In the present disclosure, the POI database 106 may be a database management system or the like, and may include electronic devices like computers, I/O devices, storage devices, etc.

The display 108 is for displaying visual information that the multimedia device 100 wants to display to the driver, and in an embodiment of the present disclosure, various guide messages (pop-ups) for providing a parking location may be displayed.

A microphone 110, a camera 120, a Global Positioning System (GPS) communicator 130, a wireless communicator 140, and a speaker 150 may be electrically connected to the multimedia device 100 to enable communication.

The microphone 110 is for receiving a voice signal, and the voice signal generated by the driver's speech or the voice signal of the floor number announcement generated in the parking lot, etc. is received by the microphone 110 and the multimedia device 100 and delivered to the voice recognizer 104. The information on the parking location of the vehicle may be obtained through voice recognition of the floor number announcement.

The camera 120 may be for photographing the front of the vehicle, or for photographing the periphery of the vehicle (around view camera or bird view camera).

The GPS communicator 130 is for receiving GPS signals from GPS satellites. The multimedia device 100 may check the current location of the vehicle from the GPS signal. In the present disclosure, the GPS communicator 130 may receive various signals including signals required for communication with other vehicles during running of the vehicle and global positioning system (GPS) signals transmitted from satellites, and may transmit the signals to the outside.

The GPS communicator 140 may include components required for performing the above-described operations. For example, the GPS communicator 140 may include at least one of a short-range communication module, a wired communication module, and a wireless communication module. The short-range communication module may include various types of short range communication modules that may transmit and receive signals using a wireless communication network in a near field, such as a Bluetooth module, an infrared communication module, a radio frequency identification (RFID) communication module, a wireless local access network (WLAN) communication module, a near field communication (NFC) communication module, and a zigbee communication module. The wired communication module may include not only various wired communication modules, such as a controller area network (CAN) communication module, a local area network (LAN) module, a wide area network (WAN) module, or a value added network (VAN) module, but also various cable communication modules, such as universal serial bus (USB), high definition multimedia interface (HDMI), digital visual interface (DVI), recommended standard 232 (RS-232), power line communication or plain old telephone service (POTS). The wireless communication module may include not only a Wifi module, a wireless broadband (Wibro) module but also wireless communication modules that support various communication schemes, such as a global system for mobile communication (GSM), a code division multiple access (CDMA), a wideband code division multiple access (WCDMA), a universal mobile telecommunications system (UMTS), time division multiple access (TDMA), long term evolution (LTE), and the like. The wireless communication module may include a wireless communication interface including an antenna and a transmitter for transmitting a wireless signal. In addition, the wireless communication module may further include a wireless signal conversion module for modulating a digital control signal output from the controller 150 through a wireless communication interface into an analog type wireless signal under the control of the controller. The wireless communication module may include a wireless communication interface including an antenna and a receiver for receiving a wireless signal. In addition, the wireless communication module may further include a wireless signal conversion module for demodulating an analog type wireless signal received through the wireless communication interface into a digital control signal.

The wireless communicator 140 is for wireless communication with a portable device 160. The controller 102 of the multimedia device 100 may transmit the vehicle parking location information to the driver's portable device 160 through the wireless communicator 140.

Similar to the GPS communicator 130, the wireless communicator 140 may receive various signals including signals required for communication with other vehicles during running of the vehicle and global positioning system (GPS) signals transmitted from satellites, and may transmit the signals to the outside. The detailed description for the wireless communication module can be applied to the wireless communicator 140.

The multimedia device 100 may output an acoustic signal through the speaker 150. For example, the controller 102 of the multimedia device 100 may output a guide message necessary for transmitting a parking location through the speaker 150 in the form of an acoustic signal.

FIG. 2 is a diagram illustrating an example of a POI database provided in a multimedia device of a vehicle according to an embodiment of the present disclosure.

As shown in FIG. 2, the POI database 106 divides the targets for providing parking location information such as various types of buildings and facilities displayed on the navigation map by category, and stores them together with their respective GPS coordinates.

For example, the categories can be classified into 'apartment complex', 'large mart/department store', 'stadium', 'amusement park', etc. In the 'apartment complex' category, the name of the apartment and the complex can be distinguished. In the 'Large Mart/Department Store' category, the name of the business place and the availability of underground/ground parking can be classified. In the 'Stadium' category, the name of the stadium can be distinguished. In the 'Amusement Park' category, the name of the business can be identified.

In addition, the data stored in the POI database 106 may further include a unique identifier (e.g., logo, trademark, etc.) of POIs for each category.

Figure 3:
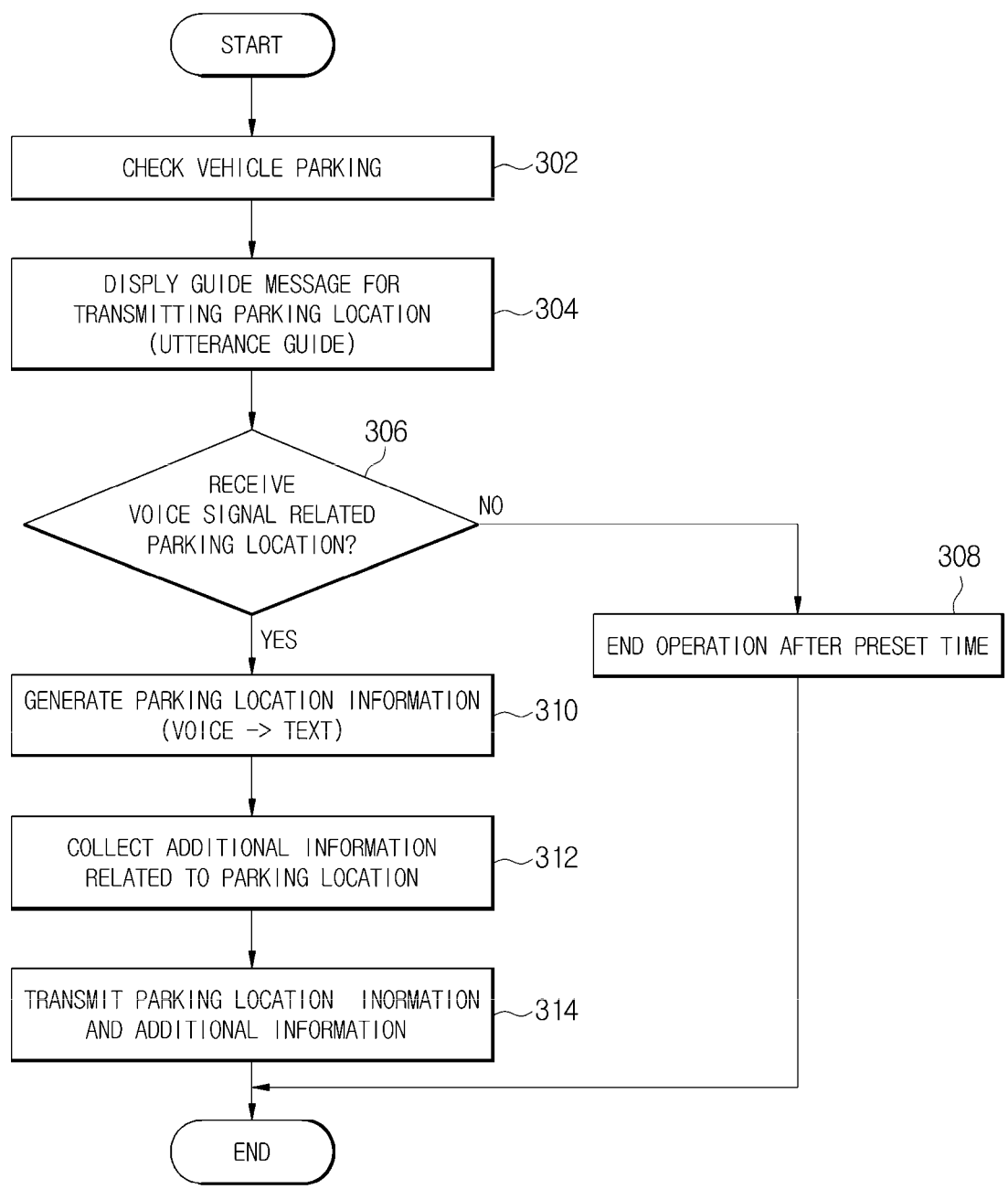
FIG. 3 is a diagram illustrating a vehicle control method according to an embodiment of the present disclosure.

FIG. 3 is a diagram illustrating a vehicle control method according to an embodiment of the present disclosure. The vehicle control method shown in FIG. 3 may be performed based on the device configurations shown in FIGS. 1 and 2.

As shown in FIG. 3, first, the controller 102 of the multimedia device 100 checks whether the vehicle has completed driving and is in a parked state (302). The controller 102 may determine that the vehicle is in a parking state when at least one of a plurality of conditions as follows is satisfied.

The first condition is that the navigation mode of the multimedia device 100 is used, and when a destination arrival announcement is generated by arriving at a destination set in the navigation mode of the multimedia device 100, the controller 102 may determine that the vehicle is parked.

The second condition is to use GPS coordinates. When the destination setting of the navigation mode is not done, and when the current location (GPS coordinates) of the vehicle identified from the GPS signal received through the GPS receiver 130 is matched with one of the parking location information provision targets stored in the POI database 106 and the GPS coordinates, and when the transmission of the vehicle is switched to the parking mode (P mode), the controller 102 may determine that the vehicle is parked. The object of providing parking location information is stored in the POI database 106, as previously mentioned in the description of FIG. 1, the object of providing parking location information is that the location information of a parking lot such as an apartment complex of a certain size or larger, a large mart/department store, a stadium, and an amusement park is secured in advance, and this is used as data for determining whether to park or providing parking information.

The third condition is to use speech recognition, when the user (driver) directly requests the transmission of the parking location through the voice recognition function (via utterance) (for example, when the user (driver) utters "send (record) the parking location"), then the controller 102 determines that the vehicle is parked.

When the floor number information is recognized from the floor number information notification periodically broadcast in the parking lot (voice recognizer recognized), the controller 102 may determine that the vehicle is parked. The floor number information notification (floor number announcement) can be used not only to determine whether the vehicle is parked, but also to check the parking location (number of floors parked) of the vehicle.

The determination of the parking state is not limited to these conditions, and other methods for determining whether the vehicle is parked may be used.

Figure 4:
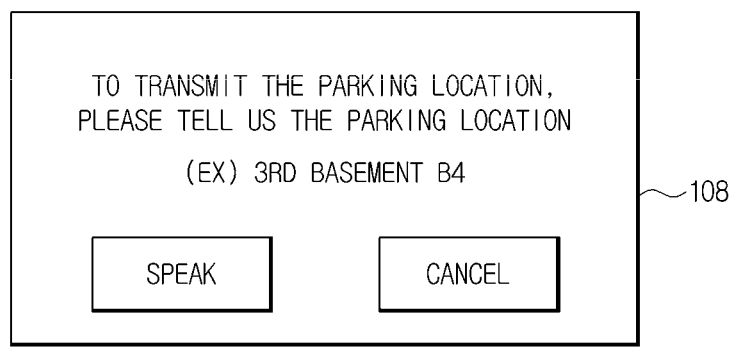
FIG. 4 is a diagram illustrating an example of a pop-up message for selecting whether to transmit a parking location of a vehicle according to an embodiment of the present disclosure.

When it is determined that the vehicle is parked, the controller 102 displays a guide message to the driver to select whether to transmit the parking location (304). In this case, the controller 102 performs a voice guidance such as "To transmit the parking location, please tell us the parking location" through the speaker 150, or through a pop-up message displayed on the display 108, the controller 102 may send a message, "please tell us the parking location." An example of a pop-up message displayed through the display 108 is shown in FIG. 4. FIG. 4 is a diagram illustrating an example of a pop-up message for selecting whether to transmit a parking location of a vehicle according to an embodiment. In the case of the pop-up message shown in FIG. 4, the driver touches the 'Speak' button in order to select the parking location guidance and utters the current parking location within a predetermined time (e.g., 5 seconds). Therefore, when driver does not want to transmit the parking location, the driver can choose to 'Cancel'.

Returning to FIG. 3, the controller 102 of the multimedia device 100 checks whether a parking location related voice signal is received through the microphone 110 and the voice recognizer 104 (306). That is, the controller 102 checks whether the driver has generated an audio signal by uttering the current parking location.

When no audio signal related to parking location is received within a preset time (e.g. 5 seconds), that is, if the driver does not utters the current parking location within a preset time ('No' in 306), the controller 102 determines that the driver does not want to transmit the parking location, and ends the operation (308).

When an audio signal related to the parking location is received, that is, when the driver utters the current parking location and generates an audio signal (YES in 306), the controller 102 generates parking location information based on the driver's utterance content (310). At this time, the controller 102 can recognize the contents of the voice signal using the ASR (Auto Speech Recognition) function of the voice recognizer 104 and convert the contents of the voice signal into text using the STT (Speech-to-Text) function.

Subsequently, the controller 102 collects additional information related to the parking location of the vehicle (312). The additional information related to the parking location collected by the controller 102 may be at least one of a POI name of the parking location, a front image, and an around view (bird view) image. The POI name of the parking location is obtained from data established in the POI database 106 described in FIG. 1 above. That is, a POI having a GPS coordinate value that matches the GPS coordinate of the current parking location may be searched in the POI database 106 to obtain the POI name. Front captured image or around view captured image may be an image in front of the vehicle (as viewed from the vehicle) taken through a camera 120 provided in the vehicle, or alternatively, may be an image around the vehicle (in the direction of looking around the vehicle).

Figure 5:
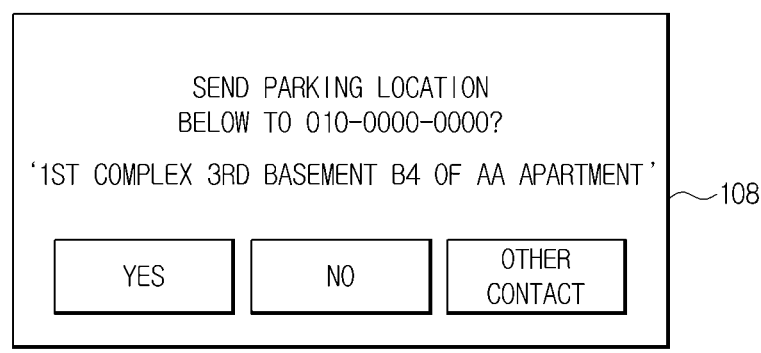
FIG. 5 is a diagram illustrating an example of a pop-up message for selecting whether to execute transmission of a parking location of a vehicle according to an embodiment of the present disclosure.

Subsequently, the controller 102 transmits parking location information and additional information to the driver's portable device (314). However, prior to transmission of the parking location information and additional information, as shown in FIG. 5, a pop-up message for the driver to select whether to transmit the parking location information and additional information is displayed on the display 108 of the multimedia device 100. FIG. 5 is a diagram illustrating an example of a pop-up message for selecting whether to execute transmission of a parking location of a vehicle according to an embodiment. The driver can transmit the parking location information and additional information to the driver's own portable device 160 by touching the 'Yes' button in the pop-up message as shown in FIG. 5. In this case, the driver's portable device 160 to which parking location information and additional information are transmitted may be a portable device having a phone number registered in advance with the multimedia device 100.

If the driver touches 'other contact', the screen of the display 108 is switched to a screen displaying a keypad, and the driver can input the number of another contact to be transmitted by touching a number on the keypad. When the driver selects 'other contact', the parking location information and additional information are transmitted to the other contact selected by the driver.

Figure 6:
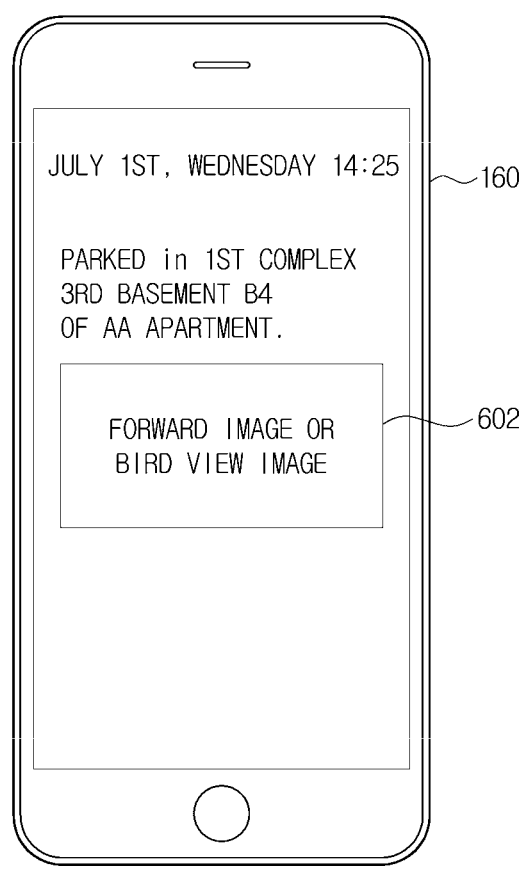
FIG. 6 is a diagram illustrating a transmission result of parking location information of a vehicle according to an embodiment of the present disclosure.

FIG. 6 is a diagram illustrating a transmission result of parking location information of a vehicle according to an embodiment of the present disclosure.

As shown in FIG. 6, when the vehicle parking location information is transmitted to the driver's portable device 160, the driver's portable device 160 displays the parking location and a captured image as shown in FIG. 6. When the driver returns to the parked vehicle in the future, by referring to the parking location information and additional information transmitted to the portable device 160, the driver can quickly and accurately find the location where the vehicle is parked.

The above description is merely illustrative of the technical idea, and a person of ordinary skill in the technical field of the present disclosure will be able to make various modifications, changes and substitutions within the range not departing from the essential characteristics. Accordingly, the embodiments disclosed above and the accompanying drawings are not intended to limit the technical idea, but to explain the technical idea, and the scope of the technical idea is not limited by the embodiments and the accompanying drawings. The scope of protection should be interpreted by the scope of the claims below, and all technical ideas within the scope of the same should be construed as being included in the scope of the rights.

According to an aspect of the present disclosure, by transmitting the parking position information of the vehicle to the driver's portable device, the driver can accurately find the parking position of the vehicle without forgetting.

What is claimed is:

1. A controlling method of a vehicle, comprising:
checking whether the vehicle is parked;
upon checking that the vehicle is parked, guiding a driver by displaying a pop-up message on a display of the vehicle to select whether to transmit parking location information to a driver's portable device;
in response to a driver's selection of the pop-up message for transmitting the parking location information, receiving the parking location information in a form of an audio signal from the driver;
acquiring additional information related to the parking location information; and
transmitting the parking location information and the additional information to the driver's portable device;
wherein the parking location information includes a number of floors in a building in which the vehicle is located; and
wherein the additional information includes an image around the vehicle at a location where the vehicle is parked.

2. The method according to claim 1, wherein the checking whether the vehicle is parked includes determining that the vehicle is parked when the vehicle arrives at a destination set in a navigation mode.

3. The method according to claim 1, wherein the checking whether the vehicle is parked includes determining, when current Global Positioning System (GPS) coordinates of the vehicle identified from a GPS signal match any one of a plurality of preset interest areas and when the vehicle is in a parking mode, the vehicle is parked.

4. The method according to claim 3, wherein the plurality of preset interest areas are targets preset to provide the parking location information, and
wherein categories, names, and GPS coordinates of each of the plurality of preset interest areas are prestored in a database and provided to the vehicle.

5. The method according to claim 1, wherein the checking whether the vehicle is parked includes determining, when a request for transmission of the parking location information occurs from the driver, that the vehicle is parked.

6. The method according to claim 1, wherein the transmitting the parking location information includes converting and transmitting the parking location information in a form of an audio signal generated by a driver's utterance into textual parking location information.

7. The method according to claim 1, wherein the transmitting the parking location information includes converting and transmitting the parking location information in a form of an audio signal generated by the number of floors in the building in which the vehicle is located.

8. A vehicle, comprising:
a Global Positioning System (GPS) communicator configured to receive a GPS signal;
a navigation for route guidance;
a voice recognizer configured to recognize an audio signal received through a microphone; and
a controller configured to:
check whether the vehicle is parked;
guide a driver by displaying a pop-up message on a display of the vehicle to select whether to transmit parking location information to a driver's portable device when it is confirmed that the vehicle is parked;
receive the parking location information in a form of an audio signal from the driver when the driver selects the pop-up message to transmit the parking location information;
acquire additional information related to the parking location information; and
transmit the parking location information and the additional information to the driver's portable device,
wherein the parking location information includes a number of floors in a building in which the vehicle is located; and
wherein the additional information includes an image around the vehicle at a location where the vehicle is parked.

9. The vehicle according to claim 8, wherein the controller determines that the vehicle is parked when the vehicle arrives at a destination set in a navigation mode.

10. The vehicle according to claim 8, when current GPS coordinates of the vehicle identified from the GPS signal match any one of a plurality of preset interest areas and when the vehicle is in a parking mode, the controller determines that the vehicle is parked.

11. The vehicle according to claim 10, wherein the plurality of preset interest areas are targets preset to provide the parking location information, and
wherein categories, names, and GPS coordinates of each of the plurality of preset interest areas are prestored in a database and provided to the vehicle.

12. The vehicle according to claim 8, wherein the controller determines that the vehicle is parked when a request for transmission of the parking location information occurs from the driver.

13. The vehicle according to claim 8, wherein the controller converts and transmits the parking location information in a form of an audio signal generated by a driver's utterance into textual parking location information.

14. The vehicle according to claim 8, wherein the controller converts and transmits the parking location information in a form of an audio signal generated by the number of floors in the building in which the vehicle is located.

15. A controlling method of a vehicle, comprising:
checking whether the vehicle is parked;
upon checking that the vehicle is parked, guiding a driver by displaying a pop-up message on a display of the vehicle to select whether to transmit parking location information to a driver's portable device;
in response to a driver's selection of transmitting the parking location information, receiving the parking location information in a form of an audio signal from the driver when the driver selects the pop-up message to transmit the parking location information;
acquiring an image by capturing surroundings of the vehicle at a parking location;
converting the parking location information in the form of the audio signal into parking location information in the form of text; and
transmitting the image around the vehicle to the driver's portable device together with the parking location information converted into the text form,
wherein the parking location information includes a number of floors in a building in which the vehicle is located.

* * * * *